US009832985B2

(12) United States Patent
Moore, Jr. et al.

(10) Patent No.: US 9,832,985 B2
(45) Date of Patent: Dec. 5, 2017

(54) COLLAPSIBLE, CARRYING AND STORAGE CASE FOR FISHING EQUIPMENT

(71) Applicants: Stanford Thomas Moore, Jr., Selbyville, DE (US); Jane R. Moore, Selbyville, DE (US)

(72) Inventors: Stanford Thomas Moore, Jr., Selbyville, DE (US); Jane R. Moore, Selbyville, DE (US)

( * ) Notice: Subject to any disclaimer, the term of this patent is extended or adjusted under 35 U.S.C. 154(b) by 0 days.

(21) Appl. No.: 14/659,573

(22) Filed: Mar. 16, 2015

(65) Prior Publication Data
US 2015/0257377 A1  Sep. 17, 2015

Related U.S. Application Data

(60) Provisional application No. 61/954,056, filed on Mar. 17, 2014.

(51) Int. Cl.
A01K 97/08 (2006.01)

(52) U.S. Cl.
CPC .................... A01K 97/08 (2013.01)

(58) Field of Classification Search
CPC ................................................. A01K 97/08
USPC ........................................ 43/26; 206/315.11
See application file for complete search history.

(56) References Cited

U.S. PATENT DOCUMENTS

| 2,640,622 | A |   | 6/1953  | Sabatino |            |
| 2,650,449 | A | * | 9/1953  | Suring   | A01K 97/08 |
|           |   |   |         |          | 206/315.11 |
| 2,854,775 | A | * | 10/1958 | Kleckley | A01K 97/08 |
|           |   |   |         |          | 206/315.11 |
| 3,575,327 | A |   | 4/1971  | Harrison |            |
| 3,641,697 | A | * | 2/1972  | Heidtman | A01K 97/08 |
|           |   |   |         |          | 206/315.11 |
| 3,772,819 | A |   | 11/1973 | Ratzlaff |            |
| 3,972,144 | A | * | 8/1976  | Geisler  | A45C 11/24 |
|           |   |   |         |          | 206/315.11 |

(Continued)

FOREIGN PATENT DOCUMENTS

EP        0359520 A1    3/1990

OTHER PUBLICATIONS

"L.L.Bean," http://www.llbean.com/llb/shop/49720?productId=862431&qs=3016887_mercent_google_pla&attrValue_0=Khaki%20Brown&mr:trackingCode=97D61996-B0F0-E211-A49790E2BA285E75&mr:referralID=NA&mr:device=c&mr:adType=pla&mkwid=xEUKvh1x_dc&pcrid=30047742057, 3 pages (downloaded Mar. 28, 2017).

(Continued)

Primary Examiner — David Parsley
(74) Attorney, Agent, or Firm — Hoang Steve Ngo

(57) ABSTRACT

The present invention is a collapsible, carrying and storage case for fishing equipment. In an embodiment, the case includes at least one equipment retaining panel, at least one end panel, at least one reel protective cover, at least one rod protective cover, at least one retaining member for securing fishing reel and rod within the case, and a case closure mechanism for placing the case alternatively in a closed position and an open position, wherein the open position is at least one of an open, collapsed position and a partially open position. The at least one reel protective cover, the at least one rod protective cover, and the at least one retaining member are positioned in a certain arrangement whereby fishing reels and rods of at least a pair of fishing reels and rods do not make damaging contact with one another.

36 Claims, 5 Drawing Sheets

(56) References Cited

U.S. PATENT DOCUMENTS

| | | | | | |
|---|---|---|---|---|---|
| 4,170,801 | A | * | 10/1979 | Ward | A01K 97/08 |
| | | | | | 114/343 |
| 4,726,141 | A | | 2/1988 | McBride et al. | |
| 5,277,306 | A | * | 1/1994 | Sargent | A01K 97/06 |
| | | | | | 150/154 |
| 5,319,874 | A | * | 6/1994 | Vance | A01K 97/08 |
| | | | | | 206/315.1 |
| 5,327,669 | A | * | 7/1994 | Lannan | A01K 97/08 |
| | | | | | 206/315.11 |
| 5,488,799 | A | * | 2/1996 | Hauschild | A01K 97/06 |
| | | | | | 224/586 |
| 6,119,858 | A | * | 9/2000 | Davidson | A01K 97/08 |
| | | | | | 190/109 |
| 2012/0227309 | A1 | | 9/2012 | Fanelli | |
| 2013/0020360 | A1 | | 1/2013 | Brunnemer | |
| 2013/0255132 | A1 | | 10/2013 | Sela | |

OTHER PUBLICATIONS

"L.L.Bean," https://www.llbean.com/llb/shop/86642?page=kennebec-anglers-travel-case&csp=a&feat=49720-pprrright, 3 pages (downloaded Mar. 28, 2017).

"Gorge Fly Shop," http://www.gorgeflyshop.com/store/pc/Fishpond-Dakota-Carry-On-Rod-Reel-Case-p3736.htm?gclid=CI-OImT8LoCFYNxOgodVDwACA#.Uor7U8Skq3g, 2 pages (downloaded Nov. 23, 2013).

"Allen Company," http://allencompany.net/fishing/rod-reel-cases.html, 2 pages (downloaded Nov. 23, 2013).

* cited by examiner

COLLAPSIBLE, CARRYING AND STORAGE CASE FOR FISHING EQUIPMENT

CROSS-REFERENCE TO RELATED APPLICATION

The present application claims the priority benefit of U.S. Provisional Patent Application Ser. No. 61/954,056, filed Mar. 17, 2014, which is incorporated herein by reference in its entirety.

BACKGROUND OF THE INVENTION

Field of the Invention

The present invention generally relates to carrying and storage cases for fishing equipment. More specifically, the present invention is directed to a collapsible, carrying and storage case for fishing equipment.

Description of the Related Art

Carrying and storage cases for fishing equipment are known in the art.

Many patents, published patent applications, and/or non-patent publications in the art disclose and/or show carrying and storage cases for fishing equipment that are not collapsible for space-saving storage and/or easy storage and/or that are not of preferred or desirable size, bulkiness and/or weight.

The present invention overcomes one or more of the shortcomings of the above-described carrying and storage cases for fishing equipment. The collapsible design of the collapsible, carrying and storage case of the present invention allows the user to fully or partially open the case where many or all of the fishing equipment, such as, but not limited to, rods and reels, are accessible. The design allows compact storage of the collapsible case when empty and not in use, yet easily accessible when packing or unpacking the fishing rods and reels. The collapsible case also has handles for moving or transporting the case and vents to supply adequate air circulation. The collapsible case can be packed and unpacked quickly and easily without regard to any sequence. When the collapsible case is packed full or partially full, it can be stored in any position without damage to the contents. The Applicant is unaware of inventions or patents, taken either singly or in combination, which are seen to describe the present invention as claimed.

SUMMARY OF THE INVENTION

The present invention is directed to a collapsible, carrying and storage case for fishing equipment, such as, but not limited to, rods and reels. The collapsible case is capable of carrying and/or storing multiple rods and reels of various lengths and sizes.

An important aspect of the collapsible case is that the secured or retained arrangement of the fishing rods and reels within the case allows the case to be compact, while still providing good protection for preferably each fishing rod and reel individually, preferably each being securely fastened and partially or fully covered in a stationary position. The collapsible case is adapted for being alternatively placed in a closed position and an open, collapsed position. The collapsible case may also be alternatively placed in at least one partially open position, which helps a user gain access to, remove, and put back fishing equipment contained within the case without the need for fully placing the case in the open, collapsed position.

In an embodiment of the present invention, a collapsible case includes a first equipment retaining panel, a second equipment retaining panel, a first side panel, a second side panel, a first end panel, a second end panel, a pair of carrying handles or straps, a plurality of vents, a plurality of spare rod butt retaining members or pockets, a plurality of reel protective covers, a plurality of reel retaining members, a plurality of impressions for reel clamps and rings, a plurality of rod protective covers or cover flaps, a plurality of rod butt retaining members or pockets, a case closure member or mechanism, and a plurality of hinges. Alternatively, a collapsible case of the present invention may include some or most, but not all, of the above-mentioned components or items.

In another embodiment, the present invention is directed to a collapsible, carrying and storage case wherein the following items, described below, replace corresponding items that were included and described above in the previous embodiment of the collapsible, carrying and storage case. The following items help a user to gain access to, remove, and put back fishing equipment contained within the case without the need for fully placing the case in the open, collapsed position.

The combinations of a plurality of spare rod butt retaining pocket flaps and a plurality of spare rod butt retaining pocket closures are included in place of the plurality of spare rod butt retaining members or pockets in the previous embodiment.

The combinations of a plurality of rod protective cover flap hinges and a plurality of rod protective cover flap closures are included in place of the plurality of rod protective covers or cover flaps in the previous embodiment.

The combinations of a plurality of rod butt hinges and a plurality of rod butt pocket closures are included in place of the plurality of rod butt retaining members or pockets in the previous embodiment.

It should be understood that the above-attached figures are not intended to limit the scope of the present invention in any way.

DETAILED DESCRIPTION OF THE PREFERRED EMBODIMENTS

Referring to FIGS. 1-5, the present invention is directed to a collapsible, carrying and storage case 100,200 (or alternatively "collapsible case" or "case" hereinafter) for fishing equipment, such as, but not limited to, rods and reels.

The collapsible case 100,200 is capable of carrying and/or storing multiple rods (ROD) and reels (REEL) of various lengths and sizes. As a non-limiting example, the collapsible case 100,200 allows for space-saving storage and/or easy storage on boats, ships or fishing vessels that are on offshore fishing trips requiring multiple rods and reels which target different species of fish.

An important aspect of the collapsible case 100,200 is that the secured or retained arrangement of the fishing rods (ROD) and reels (REEL) within the case 100,200 allows the case to be compact, while still providing good protection preferably for each fishing rod (ROD) and reel (REEL) individually, preferably each being securely fastened and partially or fully covered in a stationary position.

Figure 1:
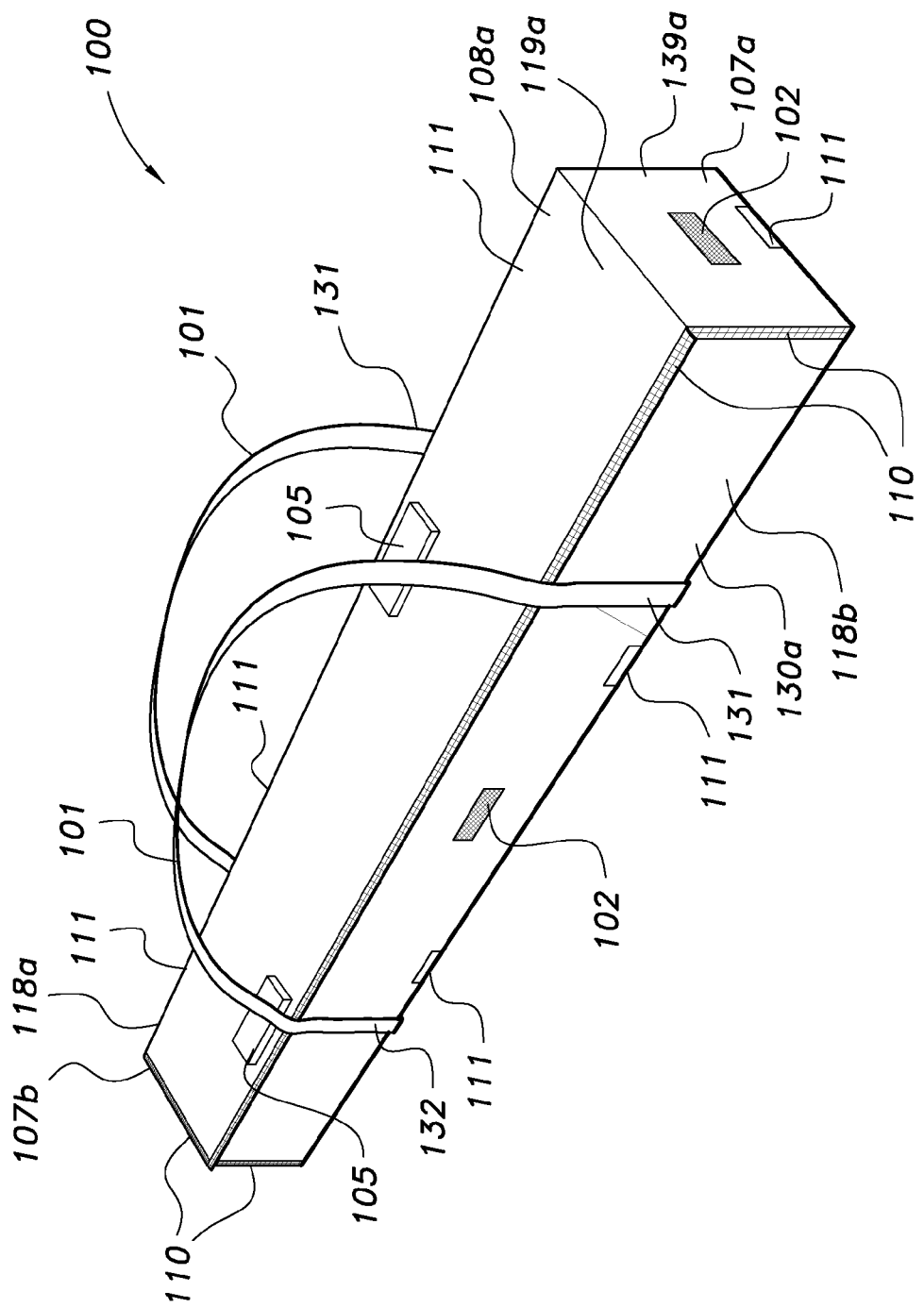
FIG. 1 is a perspective view of an embodiment of a collapsible, carrying and storage case for fishing equipment according to the present invention, wherein the case is shown in a closed position.
Figure 2:
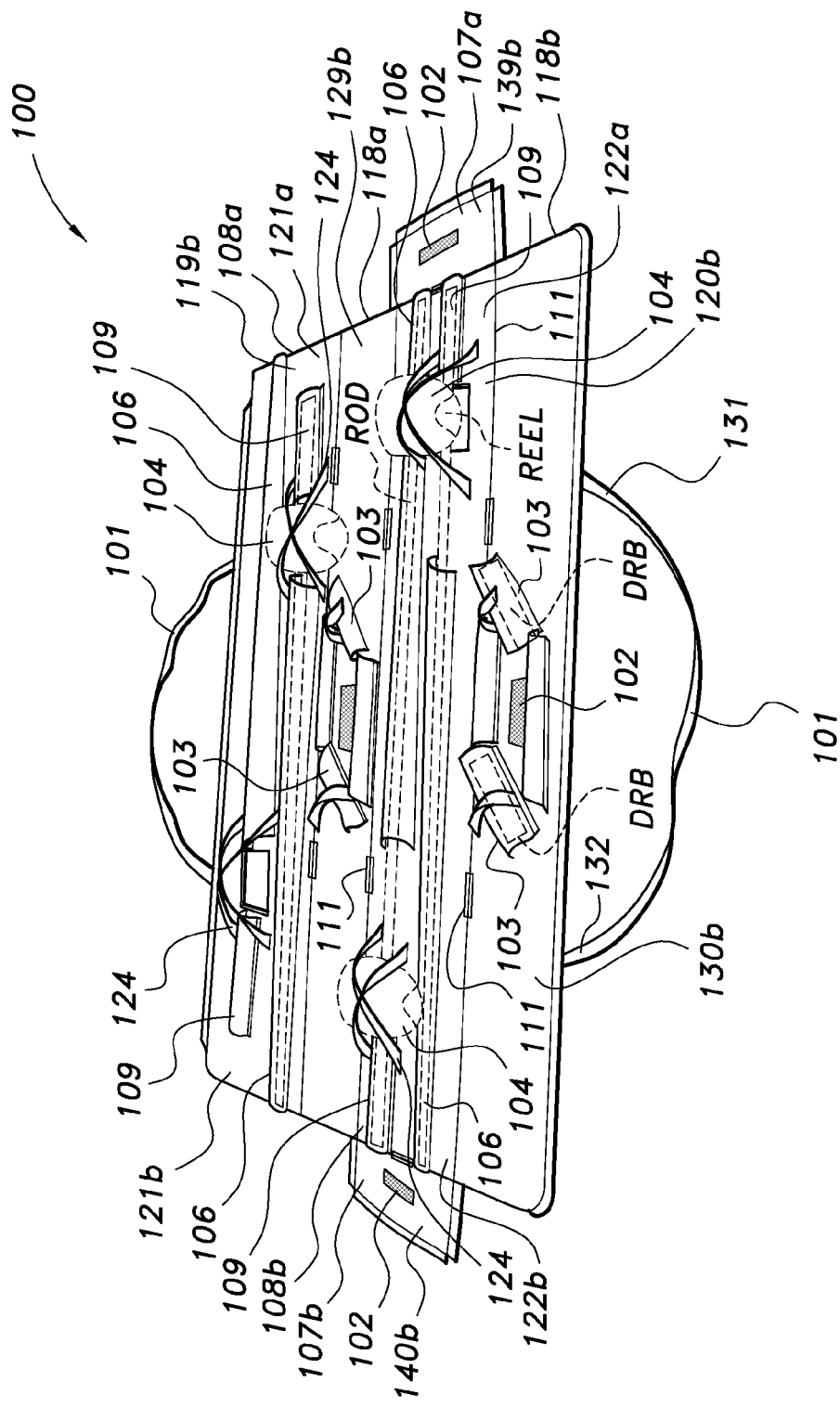
FIG. 2 is an environmental, perspective view of the collapsible, carrying and storage case of FIG. 1, wherein the case is shown in an open, collapsed position.
Figure 3:
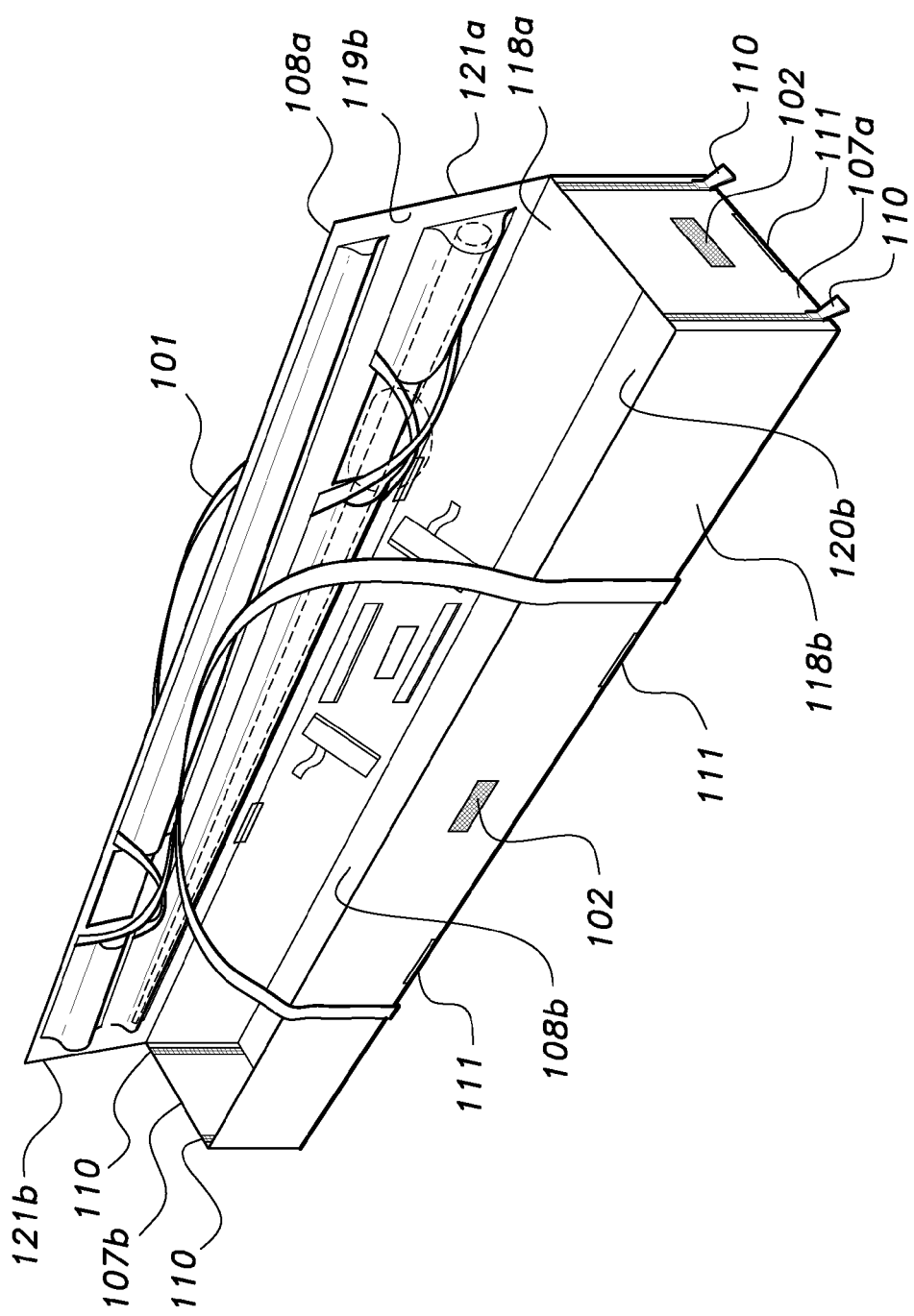
FIG. 3 is an environmental, perspective view of a collapsible, carrying and storage case for fishing equipment according to the present invention, wherein the case is shown in a partially open position.

Referring to FIGS. 1-3, the collapsible case 100 includes a first (or top) equipment retaining panel 108a, a second (or bottom) equipment retaining panel 108b, a first (or right) side panel 118a, a second (or left) side panel 118b, a first end panel 107a, a second end panel 107b, a pair of carrying handles or straps 101, a plurality of vents 102, a plurality of spare rod butt retaining members or pockets 103, a plurality of reel protective covers 104, a plurality of reel retaining members 124, a plurality of impressions 105 for reel clamps and rings, a plurality of rod protective covers or cover flaps 106, a plurality of rod butt retaining members or pockets 109, a case closure member or mechanism 110, and a plurality of hinges 111. Alternatively, a collapsible case 100 of the present invention may include some or most, but not all, of the above-mentioned components or items.

Preferably, some, most or all of the panels 107a,107b, 108a,108b, 118a,118b are hinged at predetermined locations, such as the perimeter of the panels 107a,107b,108a, 108b,118a,118b, to allow a user to place the collapsible case 100 in a closed position, as shown in FIG. 1, and, alternatively, in a fully open, collapsed position, as shown in FIG. 2. When the collapsible case 100 is in the fully open, collapsed position, the user and/or others can have full access to the fishing equipment that is stored and/or retained within the collapsible case 100. When the collapsible case 100 is in a partially open position (as shown in FIG. 3), such as when one end and/or one side of the case 100 is open, unsecured or not closed, the user and/or others can have as much access to the fishing equipment that is stored and/or retained within the collapsible case 100 that the user and/or others can reach.

As shown in FIG. 1 and as a non-limiting example, the collapsible case 100 preferably has a generally elongated, rectangular box shape or configuration when the collapsible case 100 is in the closed position. As shown in FIG. 2 and as a non-limiting example, the collapsible case 100 preferably has a generally flat box shape or configuration when the collapsible case 100 is in the open, collapsed position. Alternatively, when the collapsible case 100 is in the closed position, the collapsible case 100 may have a generally elongated shape or configuration that has a side to side cross-section of a triangle, a rectangle, a circle, and any other shape known in the art.

The first (or top) equipment retaining panel 108a and second (or bottom) equipment retaining panel 108b are opposing panels that face one another when the collapsible case 100 is in the closed position. Each of the first equipment retaining panel 108a and second equipment retaining panel 108b has an outer side 119a,120a (not shown) and an inner side 119b,120b, respectively. Preferably, each of the equipment retaining panels 108a,108b is a hinged panel. Alternatively, the case 100 may include just one equipment retaining panel.

Each of the first (or top) equipment retaining panel 108a and second (or bottom) equipment retaining panel 108b may have a pair of reel protective covers 104, a pair of reel retaining members 124, and a pair of rod butt retaining members or pockets 109, such as shown in FIG. 2, that are secured or attached to the inner side 119b,120b and preferably positioned at opposite ends 121a,121b (or 122a,122b) (at one end 121a or 121b (or 122a or 122b) when there is one reel protective cover 104, one reel retaining member 124, and one rod butt retaining member or pocket 109) of the equipment retaining panel 108a,108b, respectively. Preferably, for each pair of reel protective covers 104, pair of reel retaining members 124, and pair of rod butt retaining members or pockets 109, each of one reel protective cover 104, one reel retaining member 124, and one rod butt retaining member or pocket 109 is secured or attached offset (such as by a few inches) toward the right or left of the center at one end 121a (or 122a) while each of the other reel protective cover 104, other reel retaining member 124, and other rod butt retaining member or pocket 109 is also secured or attached offset toward the right or left of the center at the other end 121b (or 122b) such that the rods (ROD) at opposite ends 121a,121b (or 122a,122b) will preferably not make damaging contact with each other when retained on a particular equipment retaining panel 108a, 108b, respectively, and be able to fit inside the collapsible case 100 when the case 100 is in the closed position. In addition, when each equipment retaining panel 108a,108b has two or more reel protective covers 104, two or more reel retaining members 124, and two or more rod butt retaining members or pockets 109, it is preferred that the reel protective covers 104, reel retaining members 124, and rod butt retaining members or pockets 109 are offset (such as by a few inches) more away from the ends 121a,121b of equipment retaining panel 108a when compared to the positioning of the reel protective covers 104, reel retaining members 124, and rod butt retaining members or pockets 109 about the ends 122a,122b of equipment retaining panel 108b such that the retained reels (REEL) on different equipment retaining panels 108a,108b at a corresponding end 121a,122a (or 121b,122b) will preferably avoid making damaging contact with each other, and thus allowing the retained reels (REEL) and/or rods (ROD) to be able to fit inside the collapsible case 100 when the case 100 is in the closed position.

Each of the first (or top) equipment retaining panel 108a and second (or bottom) equipment retaining panel 108b may have a pair of impressions 105 for reel clamps and rings, such as shown in FIGS. 1 and 2, that are correspondingly positioned on the outer side 119a,120a and inner side 119b,120b and at opposite ends 121a,121b (or 122a,122b) of that particular equipment retaining panel 108a,108b. Preferably, for each pair of impressions 105 for reel clamps and rings, one impression 105 for reel clamps and rings is positioned offset toward the right or left of the center at one end 121a (or 122a) while the other impression 105 for reel clamps and rings is also positioned offset toward the right or left of the center at the other end 121b (or 122b) such that the rods (ROD) will preferably not make damaging contact with each other and be able to fit inside the collapsible case 100 when the case 100 is in the closed position.

Each of the first (or top) equipment retaining panel 108a and second (or bottom) equipment retaining panel 108b may have a pair of rod protective covers or cover flaps 106, such as shown in FIG. 2, that are positioned on the inner side 119*b*,120*b* of the corresponding equipment retaining panel 108*a*,108*b*. Preferably, for each pair of rod protective covers or cover flaps 106, one rod protective cover or cover flap 106 is positioned offset toward the right or left side of the corresponding equipment retaining panel 108*a*,108*b* while the other rod protective cover or cover flap 106 is also positioned offset toward the right or left of the side of the same equipment retaining panel 108*a*,108*b* such that the rods (ROD) will preferably not make damaging contact with each other and be able to fit inside the collapsible case 100 when the case 100 is in the closed position.

The first (or right) side panel 118*a* and second (or left) side panel 118*b* are opposing panels that face one another when the collapsible case 100 is in the closed position. Each of the first side panel 118*a* and second side panel 118*b* has an outer side 129*a* (not shown), 130*a* and an inner side 129*b*,130*b*. Preferably, each of the first side panel 118*a* and second side panel 118*b* has a vent 102 that is centrally located in the corresponding side panel 118*a*,118*b*. Also preferably, each of the first side panel 118*a* and second side panel 118*b* has a pair of spare rod butt retaining members or pockets 103 that are positioned about the corresponding vent 102 on the inner side 129*b*,130*b* of the corresponding side panel 118*a*,118*b*. Each of the spare rod butt retaining members or pockets 103 is for securing or retaining a spare, detachable rod butt (DRB) (such as, but not limited to, a bent rod butt or a straight rod butt; particularly applicable for a bent rod butt since a bent rod butt, when attached to a rod, would not fit or have trouble fitting inside the case 100 when the case 100 is in the closed position).

The first end panel 107*a* and second end panel 107*b* are opposing panels that face one another when the collapsible case 100 is in the closed position. Each of the first end panel 107*a* and second end panel 107*b* has an outer side 139*a*, 140*a* (not shown) and an inner side 139*b*,140*b*. Preferably, each of the first end panel 107*a* and second end panel 107*b* has a vent 102 that is centrally located in the corresponding end panel 107*a*,107*b*.

The pair of carrying handles or straps 101 may be used by a user in carrying the case 100 and the contents within the case 100 when the case 100 is in the closed position. Each carrying handle 101 has a first end 131 and a second end 132, and may be secured or attached to the case 100 at any applicable predetermined locations, such as, but not limited to, a corresponding side panel 118*a*,118*b* and/or equipment retaining panel 108*a*,108*b*, such as shown in FIGS. 1 and 2. Alternatively, the case 100 may include just one carrying handle or strap 101, or more than two carrying handles or straps 101.

The plurality of vents 102 allow air to enter and exit the case 100 so as to provide air circulation for the internal area of the case 100 and the contents within the case 100 when the case 100 is in the closed position. The vents 102 may be located at any applicable predetermined locations about one or more panel 107*a*,107*b*,108*a*,108*b*,118*a*,118*b* of the case 100. Alternatively, the case 100 may include just one vent 102.

Each of the plurality of spare rod butt retaining members or pockets 103 is for securing or retaining a spare, detachable rod butt (DRB) (such as, but not limited to, a bent rod butt or a straight rod butt; particularly applicable for a bent rod butt since a bent rod butt, when attached to a rod, would not fit or have trouble fitting inside the case 100 when the case 100 is in the closed position) at a predetermined location about the case 100, and also is for protecting the spare rod butt within the case 100. Preferably, the spare rod butt retaining members or pockets 103 include a cushioning feature. The spare rod butt retaining members or pockets 103 may be secured or attached to the case 100 at any applicable predetermined locations, such as, but not limited to, the inner sides 129*b*,130*b* of the side panels 118*a*,118*b*, such as shown in FIG. 2. Alternatively, the case 100 may include just one spare rod butt retaining member or pocket 103.

Each of the plurality of reel protective covers 104 is for covering a reel (REEL) so as to prevent that reel (REEL) from being damaged or obtaining scratches. Preferably, the reel protective covers 104 include a cushioning feature. The reel protective covers 104 may be secured or attached to the case 100 at any applicable predetermined locations, such as, but not limited to, the inner sides 119*b*,120*b* of the equipment retaining panels 108*a*,108*b*, such as shown in FIG. 2, or may not be secured nor attached to the case 100 and only applied to reels (REEL) when needed. Alternatively, the case 100 may include just one reel protective cover 104.

Each of the plurality of reel retaining members 124 is for securing or retaining a reel (REEL) at a predetermined location about the case 100. The reel retaining members 124 may be secured or attached to the case 100 at any applicable predetermined locations, such as, but not limited to, the inner sides 119*b*,120*b* of the equipment retaining panels 108*a*,108*b*, such as shown in FIG. 2. The reel retaining members 124 may be secured or attached to the equipment retaining panels 108*a*,108*b* by means of any permanent or detachable device, such as, but not limited to, snaps, hooks, rings, hook and loop fasteners, any combination thereof, or any permanent or detachable device known in the art. Preferably, each of the reel retaining members 124 extends over and is adjacent to the top of the corresponding reel (REEL). Alternatively, the case 100 may include just one reel retaining member 124.

Each of the plurality of impressions 105 for reel clamps and rings is for receiving or accommodating reels (REEL) with or without rings and/or with or without clamps. The plurality of impressions 105 for reel clamps and rings may be located at any applicable predetermined locations about the case 100, such as, but not limited to, the outer sides 119*a*,120*a* and inner sides 119*b*,120*b* of the equipment retaining panels 108*a*,108*b*, such as shown in FIGS. 1 and 2. Preferably, each of the plurality of impressions 105 is positioned underneath and is adjacent to the bottom of the corresponding reel (REEL) when the reel (REEL) is positioned and secured inside the case 100. Alternatively, the case 100 may include just one impression for reel clamps and rings.

Each of the plurality of rod protective covers or cover flaps 106 is for covering a rod (ROD) so as to prevent the rod (ROD) from being damaged or obtaining scratches, and also is for securing the rod (ROD) within the case 100. Preferably, the rod protective cover flaps 106 include a cushioning feature. The rod protective cover flaps 106 may be secured or attached to the case 100 at any applicable predetermined locations, such as, but not limited to, the inner sides 119*b*, 120*b* of the equipment retaining panels 108*a*,108*b*, such as shown in FIG. 2, or may not be secured nor attached to the case 100 and only applied to rods (ROD) when needed. Alternatively, the case 100 may include just one rod protective cover flap 106.

Each of the plurality of rod butt retaining members or pockets 109 is for securing or retaining a rod butt (such as, but not limited to, a straight rod butt; particularly applicable for a straight rod butt since a bent rod butt, when attached to a rod, would not fit or have trouble fitting inside the case 100 when the case 100 is in the closed position) at a predetermined location about the case 100, and also is for protecting the rod butt within the case 100. Preferably, the rod butt retaining members or pockets 109 include a cushioning feature. The rod butt retaining members or pockets 109 may be secured or attached to the case 100 at any applicable predetermined locations, such as, but not limited to, the inner sides 119b,120b of the equipment retaining panels 108a,108b, such as shown in FIG. 2. Alternatively, the case 100 may include just one rod butt retaining member or pocket 109.

The case closure member or mechanism 110 is for placing the case 100 in the closed position from the open, collapsed position or partially open position (such as at one or both ends, at one or both sides, or any combination thereof), and vice versa, preferably by a user. The case closure member or mechanism 110 is/are positioned at predetermined locations, such as shown in FIGS. 1 and 2, about the case 100. The case closure member or mechanism 110 may be at least one zipper, hook and loop fasteners, snaps, ties, buttons, and any other closure member or mechanism known in the art.

The plurality of hinges 111 are positioned at predetermined locations, such as shown in FIGS. 1 and 2, about the case 100, and preferably work in tandem with the hinged panels so as to allow the case 100 to be able placed in the closed position and open, collapsed position by a user. The hinges 111 may be any type of hinge(s) known in the art.

The panels 107a,107b,108a,108b,118a,118b may be manufactured of any material and/or fabric, such as, but not limited to, plastic, nylon (such as ballistic nylon), foam, metal, cardboard, wood, fiberglass, any combination thereof, and any material and/or fabric known in the art. Preferably, the panels 107a,107b,108a,108b,118a,118b are manufactured of a material and/or fabric nylon that is water resistant and/or mold and/or mildew resistant.

The plurality of spare rod butt retaining members or pockets 103, plurality of reel protective covers 104, plurality of reel retaining members 124, plurality of rod protective covers or cover flaps 106, and plurality of rod butt retaining members or pockets 109 may be manufactured of any material and/or fabric, such as, but not limited to, plastic, nylon (such as ballistic nylon), foam, cardboard, any combination thereof, and any material and/or fabric known in the art.

Figure 4:
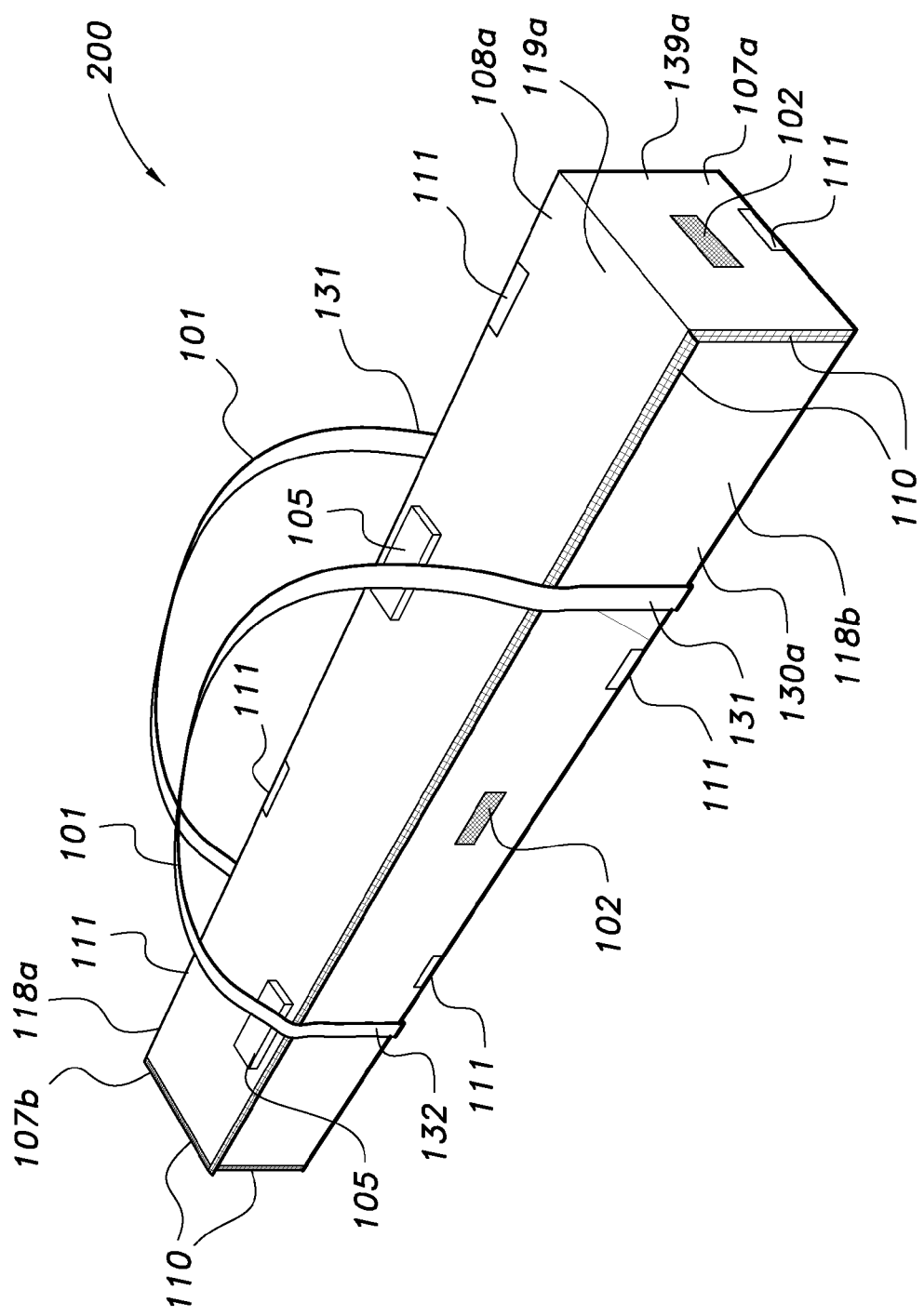
FIG. 4 is a perspective view of another embodiment of a collapsible, carrying and storage case for fishing equipment according to the present invention, wherein the case is shown in a closed position.
Figure 5:
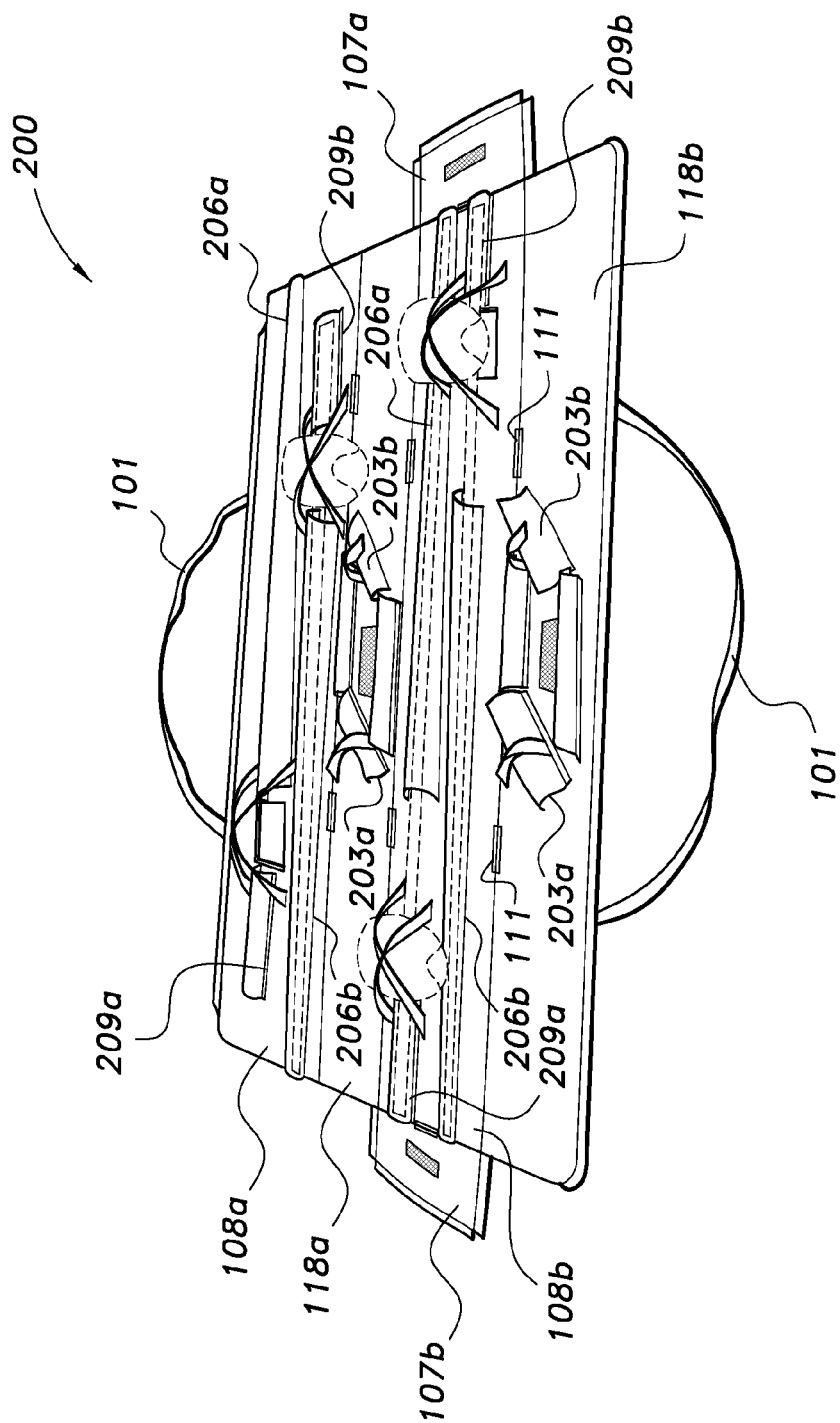
FIG. 5 is an environmental, perspective view of the collapsible, carrying and storage case of FIG. 4, wherein the case is shown in an open, collapsed position.

In another embodiment and referring to FIGS. 4 and 5, the present invention is directed to a collapsible, carrying and storage case 200 wherein the following items, described below, replace corresponding components or items that were included and described above in the previous embodiment of collapsible, carrying and storage case 100. The following items help a user to gain access to, remove, and put back fishing equipment contained within the case 200 without the need for fully placing the case 200 in the open, collapsed position.

The combinations of a plurality of spare rod butt retaining pocket flaps 203a and a plurality of spare rod butt retaining pocket closures 203b are included in place of the plurality of spare rod butt retaining members or pockets 103. Each combination of a spare rod butt retaining pocket flap 203a and a spare rod butt retaining pocket closure 203b is for securing or retaining a spare, detachable rod butt (such as, but not limited to, a bent rod butt or a straight rod butt; particularly applicable for a bent rod butt since a bent rod butt, when attached to a rod, would not fit or have trouble fitting inside the case 200 when the case 200 is in the closed position) at a predetermined location about the case 200, and also is for protecting the spare rod butt within the case 200. Preferably, each combination of a spare rod butt retaining pocket flap 203a and a spare rod butt retaining pocket closure 203b includes a cushioning feature. The combination of a spare rod butt retaining pocket flap 203a and a spare rod butt retaining pocket closure 203b may be secured or attached to the case 200 at any applicable predetermined locations, such as, but not limited to, the inner sides 129b, 130b of the side panels 118a,118b, such as shown in FIG. 5. Alternatively, the case 200 may include just one combination of a spare rod butt retaining pocket flap 203a and a spare rod butt retaining pocket closure 203b.

The combinations of a plurality of rod protective cover flap hinges 206a and a plurality of rod protective cover flap closures 206b are included in place of the plurality of rod protective covers or cover flaps 106. Each combination of a rod protective cover flap hinge 206a and a rod protective cover flap closure 206b is for covering a rod (ROD) so as to prevent the rod (ROD) from being damaged or obtaining scratches, and is for securing the rod (ROD) within the case 200. Preferably, the rod protective cover flap closure 206b includes a cushioning feature. The combination of a rod protective cover flap hinge 206a and a rod protective cover flap closure 206b may be secured or attached to the case 200 at any applicable predetermined locations, such as, but not limited to, the inner sides 119b,120b of the equipment retaining panels 108a,108b, such as shown in FIG. 5, or may not be secured nor attached to the case 200 and only applied to rods (ROD) when needed. Alternatively, the case 200 may include just one combination of a rod protective cover flap hinge 206a and a rod protective cover flap closure 206b.

The combinations of a plurality of rod butt hinges 209a and a plurality of rod butt pocket closures 209b are included in place of the plurality of rod butt retaining members or pockets 109. Each combination of a rod butt hinge 209a and a rod butt pocket closure 209b is for securing or retaining a rod butt (such as, but not limited to, a straight rod butt; particularly applicable for a straight rod butt since a bent rod butt, when attached to a rod, would not fit or have trouble fitting inside the case 200 when the case 200 is in the closed position) at a predetermined location about the case 200, and also is for protecting the rod butt within the case 200. Preferably, each rod butt pocket closure 209b includes a cushioning feature. The combination of a rod butt hinge 209a and a rod butt pocket closure 209b may be secured or attached to the case 200 at any applicable predetermined locations, such as, but not limited to, the inner sides 119b, 120b of the equipment retaining panels 108a,108b, such as shown in FIG. 5. Alternatively, the case 200 may include just one combination of a rod butt hinge 209a and a rod butt pocket closure 209b.

The combinations of a plurality of spare rod butt retaining pocket flaps 203a and a plurality of spare rod butt retaining pocket closures 203b, combinations of a plurality of rod protective cover flap hinges 206a and a plurality of rod protective cover flap closures 206b, and plurality of rod butt pocket closures 209b may be manufactured of any material and/or fabric, such as, but not limited to, plastic, nylon (such as ballistic nylon), foam, cardboard, and any material and/or fabric known in the art.

As a non-limiting example, the collapsible case 100,200, when in the closed position, may have outside dimensions of a width of about 12", a height of 9 and ½", and a length of multiple feet.

As a non-limiting example, the size or dimensions of a reel in the art may be about a width of about 11" and a height of about 8".

It is to be understood that the present invention is not limited to the embodiments described above or as shown in the attached figures, but encompasses any and all embodiments within the spirit of the invention.

What is claimed is:

1. A collapsible, carrying and storage case for fishing equipment comprising:
   a first equipment retaining panel and a second equipment retaining panel, wherein each of said first equipment retaining panel and said second equipment retaining panel comprises a first end, a second end, an outer surface, and an inner, securing surface, and wherein each inner, securing surface of said first equipment retaining panel and said second equipment retaining panel is planar along a substantial length of said each inner, securing surface from said first end to said second end of a corresponding equipment retaining panel of said first equipment retaining panel and said second equipment retaining panel;
   at least one end panel secured to said first equipment retaining panel and said second equipment retaining panel such that said case may be placed alternatively in a closed position and in at least one open position, wherein said at least one open position is selected from the group consisting of a fully open, collapsed position and a partially open position;
   a plurality of retaining members for securing the fishing reels and the fishing rods within said case and to at least one equipment retaining panel of said first equipment retaining panel and said second equipment retaining panel,
   wherein the fishing reels and the fishing rods are secured by said plurality of retaining members in a predetermined, offset arrangement that has at least two offset positions whereby a reel and a rod of a first rod and reel may be secured in a first offset position of said predetermined, offset arrangement that is a predetermined distance from center of said first end of said first equipment retaining panel, that is directed toward a first lateral direction about said first end of said first equipment retaining panel, and that is a predetermined distance from said first end toward a midpoint or a center of said first equipment retaining panel, and whereby a reel and a rod of a second rod and reel may be secured in a second offset position of said predetermined, offset arrangement that is a predetermined distance from center of said second end of said first equipment retaining panel, that is directed toward a second lateral direction about said second end of said first equipment retaining panel, and that is a predetermined distance from said second end toward said midpoint of said first equipment retaining panel, such that a tip end of the rod of the first rod and reel points toward the reel of the second rod and reel, that a tip end of the rod of the second rod and reel points toward the reel of the first rod and reel, and that the rod of the first rod and reel and rod of the second rod and reel are separated by a non-damaging, contact distance,
   wherein, when a reel and a rod of a third rod and reel are needed to be secured by said plurality of retaining members in said predetermined, offset arrangement, the reel and the rod of the third rod and reel may be secured in a third offset position of said predetermined, offset arrangement that is a predetermined distance from center of said first end of said second equipment retaining panel, that is directed toward a first lateral direction about said first end of said second equipment retaining panel, and that is a predetermined distance from said first end toward a midpoint or a center of said second equipment retaining panel, and wherein, when a reel and a rod of a fourth rod and reel are needed to be secured by said plurality of retaining members in said predetermined, offset arrangement, the reel and the rod of the fourth rod and reel may be secured in a fourth offset position of said predetermined, offset arrangement that is a predetermined distance from center of said second end of said second equipment retaining panel, that is directed toward a second lateral direction about said second end of said second equipment retaining panel, and that is a predetermined distance from said second end toward said midpoint of said second equipment retaining panel, such that, when applicable, a tip end of the rod of the third rod and reel points toward the reel of the fourth rod and reel, that a tip end of the rod of the fourth rod and reel points toward the reel of the third rod and reel, and that the rod of the third rod and reel and rod of the fourth rod and reel are separated by a non-damaging, contact distance,
   wherein, when applicable, the first rod and reel and the third rod and reel are positioned in proximity to one another when said case is in said closed position such that the reel of the first rod and reel and the reel of the third rod and reel are at similar ends of said first equipment retaining panel and said second equipment retaining panel and such that the first rod and reel and the third rod and reel are separated by a non-damaging, contact distance,
   wherein, when applicable, the second rod and reel and the fourth rod and reel are positioned in proximity to one another when said case is in said closed position such that the reel of the second rod and reel and the reel of the fourth rod and reel are at similar ends of said first equipment retaining panel and said second equipment retaining panel and such that the second rod and reel and the fourth rod and reel are separated by a non-damaging, contact distance,
   wherein said predetermined distance from said second end toward said midpoint of said first equipment retaining panel is sufficiently different from said predetermined distance from said second end toward said midpoint of said second equipment retaining panel such that, when applicable, the reel and rod of the first rod and reel do not make damaging contact with the corresponding reel and rod of the third rod and reel when said case is in said closed position,
   wherein said predetermined distance from said second end toward said midpoint of said first equipment retaining panel is sufficiently different from said predetermined distance from said second end toward said midpoint of said second equipment retaining panel such that, when applicable, the reel and rod of the second rod and reel do not make damaging contact with the corresponding reel and rod of the fourth rod and reel when said case is in said closed position; and
   a case closure mechanism for securing said first equipment retaining panel, said second equipment retaining panel, and said at least one end panel to one another.

2. The collapsible, carrying and storage case according to claim 1, wherein at least one equipment retaining panel of said first equipment retaining panel and said second equipment retaining panel further comprises at least one impression for accommodating a corresponding reel clamp and ring.

3. The collapsible, carrying and storage case according to claim 1, wherein said plurality of retaining members is at least one of at least one reel retaining member and at least one rod protective cover which also secure the fishing rod within said case.

4. The collapsible, carrying and storage case according to claim 1, wherein said first equipment retaining panel and said second equipment retaining panel are a pair of opposing equipment retaining panels when said case is in said closed position.

5. The collapsible, carrying and storage case according to claim 1, further comprising at least one side panel, wherein each side panel comprises a first end and a second end, and wherein said at least one side panel is secured to said at least one end panel, said first equipment retaining panel, and said second equipment retaining panel.

6. The collapsible, carrying and storage case according to claim 1, further comprising at least one rod butt retaining member, wherein each rod butt retaining member is adapted for securing a rod butt to a corresponding equipment retaining panel of said first equipment retaining panel and said second equipment retaining panel.

7. The collapsible, carrying and storage case according to claim 1, further comprising at least one spare rod butt retaining member, wherein each spare rod butt retaining member is adapted for securing a spare, detachable rod butt to a corresponding panel of said first equipment retaining panel, said second equipment retaining panel, and said at least one end panel.

8. The collapsible, carrying and storage case according to claim 1, further comprising at least one carrying handle.

9. The collapsible, carrying and storage case according to claim 1, further comprising at least one vent.

10. The collapsible, carrying and storage case according to claim 1, further comprising a plurality of hinges.

11. The collapsible, carrying and storage case according to claim 1, further comprising at least one reel protective cover for protecting a plurality of fishing reels secured within said case and secured to at least one equipment retaining panel of said first equipment retaining panel and said second equipment retaining panel; and at least one rod protective cover for protecting a plurality of fishing rods secured within said case and secured to at least one equipment retaining panel of said first equipment retaining panel and said second equipment retaining panel, wherein said at least one reel protective cover, said at least one rod protective cover, and said plurality of retaining members are positioned in said predetermined, offset arrangement.

12. The collapsible, carrying and storage case according to claim 1, wherein each inner, securing surface of said first equipment retaining panel and said second equipment retaining panel is planar along an entire length of said each inner, securing surface from said first end to said second end of said corresponding equipment retaining panel of said first equipment retaining panel and said second equipment retaining panel.

13. The collapsible, carrying and storage case according to claim 4, wherein distances between two corresponding opposing points along said first ends to said second ends of said pair of opposing equipment retaining panels are about the same.

14. A collapsible, carrying and storage case for fishing equipment comprising:
a pair of opposing equipment retaining panels, wherein each of said pair of equipment retaining panels comprises a first end, a second end, an outer surface, and an inner, securing surface, and wherein each inner, securing surface of said pair of equipment retaining panels is planar along a substantial length of said each inner, securing surface from said first end to said second end of a corresponding equipment retaining panel of said pair of equipment retaining panels;
a pair of opposing side panels secured to said pair of equipment retaining panels, wherein each side panel comprises a first end and a second end;
a pair of opposing end panels secured to said pair of equipment retaining panels and said pair of side panels such that said case may be placed alternatively in a closed position and in at least one open position, wherein said at least one open position is selected from the group consisting of a fully open, collapsed position and a partially open position, and wherein said case has a generally rectangular configuration when said case in said closed position;
a plurality of reel protective covers for protecting a plurality of fishing reels secured within said case and secured to said pair of equipment retaining panels;
a plurality of rod protective covers for protecting a plurality of fishing rods secured within said case and secured to said pair of equipment retaining panels;
a plurality of retaining members for securing the fishing reels and the fishing rods within said case and to said pair of equipment retaining panels,
wherein the fishing reels and the fishing rods are secured by said plurality of retaining members in a predetermined, offset arrangement that has at least two offset positions whereby a reel and a rod of a first rod and reel may be secured in a first offset position of said predetermined, offset arrangement that is a predetermined distance from center of said first end of a first equipment retaining panel of said pair of equipment retaining panels, that is directed toward a first lateral direction about said first end of said first equipment retaining panel, and that is a predetermined distance from said first end toward a midpoint or a center of said first equipment retaining panel, and whereby a reel and a rod of a second rod and reel may be secured in a second offset position of said predetermined, offset arrangement that is a predetermined distance from center of said second end of said first equipment retaining panel, that is directed toward a second lateral direction about said second end of said first equipment retaining panel, and that is a predetermined distance from said second end toward said midpoint of said first equipment retaining panel, such that a tip end of the rod of the first rod and reel points toward the reel of the second rod and reel, that a tip end of the rod of the second rod and reel points toward the reel of the first rod and reel, and that the rod of the first rod and reel and rod of the second rod and reel are separated by a non-damaging, contact distance,
wherein, when a reel and a rod of a third rod and reel are needed to be secured by said plurality of retaining members in said predetermined, offset arrangement, the reel and the rod of third rod and reel may be secured in a third offset position of said predetermined, offset arrangement that is a predetermined distance from center of said first end of a second equipment retaining panel of said pair of equipment retaining panels, that is directed toward a first lateral direction about said first end of said second equipment retaining panel, and that is a predetermined distance from said first end toward a midpoint or a center of said second equipment retaining panel, and wherein, when a reel and a rod of a fourth rod and reel are needed to be secured by said plurality of retaining members in said predetermined, offset arrangement, the reel and the rod of the fourth rod and reel may be secured in a fourth offset position of said predetermined, offset arrangement that is a predetermined distance from center of said second end of said second equipment retaining panel, that is directed toward a second lateral direction about said second end of said second equipment retaining panel, and that is a predetermined distance from said second end toward said midpoint of said second equipment retaining panel, such that, when applicable, a tip end of the rod of the third rod and reel points toward the reel of the fourth rod and reel, that a tip end of the rod of the fourth rod and reel points toward the reel of the third rod and reel, and that the rod of the third rod and reel and rod of the fourth rod and reel are separated by a non-damaging, contact distance, wherein, when applicable, the first rod and reel and the third rod and reel are positioned in proximity to one another when said case is in said closed position such that the reel of the first rod and reel and the reel of the third rod and reel are at similar ends of said first equipment retaining panel and second equipment retaining panel and such that the first rod and reel and the third rod and reel are separated by a non-damaging, contact distance, wherein, when applicable, the second rod and reel and the fourth rod and reel are positioned in proximity to one another when said case is in said closed position such that the reel of the third rod and reel and the reel of the fourth rod and reel are at similar ends of said first equipment retaining panel and said second equipment retaining panel and such that the second rod and reel and the fourth rod and reel are separated by a non-damaging, contact distance, wherein said predetermined distance from said second end toward said midpoint of said first equipment retaining panel is sufficiently different from said predetermined distance from said second end toward said midpoint of said second equipment retaining panel such that, when applicable, the reel and rod of the first rod and reel do not make damaging contact with the corresponding reel and rod of the third rod and reel when said case is in said closed position, wherein said predetermined distance from said second end toward said midpoint of said first equipment retaining panel is sufficiently different from said predetermined distance from said second end toward said midpoint of said second equipment retaining panel such that, when applicable, the reel and rod of the second rod and reel do not make damaging contact with the corresponding reel and rod of the fourth rod and reel when said case is in said closed position; and a case closure mechanism for securing said pair of equipment retaining panels, said pair of side panels, and said pair of end panels to one another.

15. The collapsible, carrying and storage case according to claim 14, wherein each of said pair of equipment retaining panels further comprises at least one impression for accommodating a corresponding reel clamp and ring.

16. The collapsible, carrying and storage case according to claim 14, wherein at least one of said plurality of retaining members is at least one of at least one reel retaining member and at least one rod protective cover which also secure the fishing rod within said case.

17. The collapsible, carrying and storage case according to claim 14, further comprising at least one rod butt retaining member, wherein each rod butt retaining member is adapted for securing a rod butt to a corresponding equipment retaining panel of said pair of equipment retaining panels.

18. The collapsible, carrying and storage case according to claim 14, further comprising at least one spare rod butt retaining member, wherein each spare rod butt retaining member is adapted for securing a spare, detachable rod butt to a corresponding panel of said pair of equipment retaining panels, said side panels, and said end panels.

19. The collapsible, carrying and storage case according to claim 14, further comprising at least one carrying handle.

20. The collapsible, carrying and storage case according to claim 14, further comprising at least one vent.

21. The collapsible, carrying and storage case according to claim 14, further comprising a plurality of hinges.

22. The collapsible, carrying and storage case according to claim 14, further comprising at least one rod butt retaining member, at least one spare rod butt retaining member, and at least one carrying handle, wherein said plurality of retaining members is at least one of at least one reel retaining member and at least one rod protective cover which also secure the fishing rod within said case, wherein each rod butt retaining member is adapted for securing a rod butt to a corresponding equipment retaining panel of said pair of equipment retaining panels, and wherein each spare rod butt retaining member is adapted for securing a spare, detachable rod butt to a corresponding panel of said pair of equipment retaining panels, said side panels, and said end panels.

23. The collapsible, carrying and storage case according to claim 22, wherein each of said pair of equipment retaining panels further comprises at least one impression for accommodating a corresponding reel clamp and ring.

24. The collapsible, carrying and storage case according to claim 22, further comprising at least one vent.

25. The collapsible, carrying and storage case according to claim 22, further comprising a plurality of hinges.

26. The collapsible, carrying and storage case according to claim 14, wherein each inner, securing surface of said pair of equipment retaining panels is planar along an entire length of said each inner, securing surface from said first end to said second end of said corresponding equipment retaining panel of said pair of equipment retaining panels.

27. The collapsible, carrying and storage case according to claim 14, wherein distances between two corresponding opposing points along said first ends to said second ends of said pair of opposing equipment retaining panels are about the same.

28. A collapsible, carrying and storage case for fishing equipment comprising:

a first equipment retaining panel and a second equipment retaining panel, wherein each of said first equipment retaining panel and said second equipment retaining panel comprises a first end, a second end, an outer surface, and an inner, securing surface, and wherein each inner, securing surface of said first equipment retaining panel and said second equipment retaining panel is planar along a substantial length of said each inner, securing surface from said first end to said second end of a corresponding equipment retaining panel of said first equipment retaining panel and said second equipment retaining panel;

at least one end panel secured to said first equipment retaining panel and said second equipment retaining panel such that said case may be placed alternatively in a closed position and in at least one open position, wherein said at least one open position is selected from the group consisting of a fully open, collapsed position and a partially open position;

a plurality of reel protective covers for protecting a plurality of fishing reels secured within said case and secured to said first equipment retaining panel and said second equipment retaining panel;

a plurality of combinations of a rod protective cover flap hinge and a rod protective cover flap closure for protecting a plurality of fishing rods secured within said case and secured to said first equipment retaining panel and said second equipment retaining panel;

a plurality of retaining members for securing the fishing reels and the fishing rods within said case and to said first equipment retaining panel and said second equipment retaining panel, wherein the fishing reels and the fishing rods are secured by said plurality of retaining members in a predetermined, offset arrangement that has at least two offset positions whereby a reel and a rod of a first rod and reel is secured in a first offset position that is offset toward right or left of center about said first end of said first equipment retaining panel and offset at a predetermined distance from said first end toward a midpoint of said first equipment retaining panel, and whereby a reel and a rod of a second rod and reel is secured in a second offset position that is offset toward right or left of center about said second end of said first equipment retaining panel and offset at a predetermined distance from said second end toward said midpoint of said first equipment retaining panel, such that the reel and the rod of the first rod and reel and the reel and the rod of the second rod and reel do not make damaging contact with one another when said case is in said closed position, wherein, when a reel and a rod of a third rod and reel are needed to be secured by said plurality of retaining members in said predetermined, offset arrangement, the reel and the rod of the third rod and reel is secured in a third offset position that is offset toward right or left of center about said first end of said second equipment retaining panel and offset at a predetermined distance from said first end toward a midpoint of said second equipment retaining panel, and wherein, when a reel and a rod of a fourth rod and reel are needed to be secured by said plurality of retaining members in said predetermined, offset arrangement, the reel and the rod of the fourth rod and reel is secured in a fourth offset position that is offset toward right or left of center about said second end of said second equipment retaining panel and offset at a predetermined distance from said second end toward said midpoint of said second equipment retaining panel, such that, when applicable, the reel and the rod of the third rod and reel and the reel and the rod of the fourth rod and reel do not make damaging contact with one another when said case is in said closed position, wherein the fishing reels and the fishing rods are secured by said plurality of retaining members in said predetermined, offset arrangement whereby the reel and the rod of the first rod and reel and the reel and the rod of the second rod and reel, when applicable, the reel and the rod of the third rod and reel and the reel and the rod of the fourth rod and reel do not make damaging contact with one another when said case is in said closed position, wherein said predetermined distance from said first end toward said midpoint of said first equipment retaining panel is sufficiently different from said predetermined distance from said first end toward said midpoint of said second equipment retaining panel such that, when applicable, the reel and the rod of the first rod and reel do not make damaging contact with the corresponding reel and the rod of the third rod and reel when said case is placed in said closed position, and wherein said predetermined distance from said second end toward said midpoint of said first equipment retaining panel is sufficiently different from said predetermined distance from said second end toward said midpoint of said second equipment retaining panel such that, when applicable, the reel and rod of the second rod and reel do not make damaging contact with the corresponding reel and rod of the fourth rod and reel when said case is placed in said closed position;

at least one combination of a rod butt hinge and a rod butt pocket closure, wherein each combination of a rod butt hinge and a rod butt pocket closure is adapted for securing a rod butt to a corresponding equipment retaining panel of said first equipment retaining panel and said second equipment retaining panel;

at least one combination of a spare rod butt retaining pocket flap and a spare rod butt retaining pocket closure, wherein each combination of a spare rod butt retaining pocket flap and a spare rod butt retaining pocket closure is adapted for securing a spare, detachable rod butt to a corresponding panel of said first equipment retaining panel, said second equipment retaining panel, and said at least one end panel; and a case closure mechanism for securing said first equipment retaining panel, said second equipment retaining panel, and said at least one end panel to one another.

29. The collapsible, carrying and storage case according to claim 28, wherein said plurality of retaining members is at least one of at least one reel retaining member and at least one rod protective cover which also secure the fishing rod within said case.

30. The collapsible, carrying and storage case according to claim 28, wherein each of said first equipment retaining panel and said second equipment retaining panel further comprises at least one impression for accommodating a corresponding reel clamp and ring.

31. The collapsible, carrying and storage case according to claim 28, further comprising at least one vent.

32. The collapsible, carrying and storage case according to claim 28, further comprising a plurality of hinges.

33. The collapsible, carrying and storage case according to claim 28, wherein each inner, securing surface of said first equipment retaining panel and said second equipment retaining panel is planar along an entire length of said each inner, securing surface from said first end to said second end of said corresponding equipment retaining panel of said first equipment retaining panel and said second equipment retaining panel.

34. The collapsible, carrying and storage case according to claim 28, wherein said first equipment retaining panel and said second equipment retaining panel are a pair of opposing equipment retaining panels when said case is in said closed position.

35. The collapsible, carrying and storage case according to claim 34, wherein distances between two corresponding opposing points along said first ends to said second ends of said pair of opposing equipment retaining panels are about the same.

36. The collapsible, carrying and storage case according to claim 28, further comprising at least one carrying handle.

\* \* \* \* \*